United States Patent Office 3,094,515
Patented June 18, 1963

1

3,094,515
LIGNIN DISPERSING AGENTS AND A METHOD OF MAKING THE SAME

Karl F. Keirstead, Sillery, Quebec, and Jacques Giguere and Guy Fortin, Ste. Foy, Quebec, Canada, assignors to Lignosol Chemicals Limited, Quebec, Quebec, Canada
No Drawing. Filed Nov. 6, 1961, Ser. No. 150,165
6 Claims. (Cl. 260—124)

This invention relates to lignin dispersing agents and a method of making the same.

Lignin sulphonates have a wide variation in dispersing power and furthermore, a given lignin sulphonate may vary in effectiveness when used in different systems. The dispersing powers of various dispersing agents are customarily evaluated by the use of viscometric measurements.

It is known that an effective dispersing agent may be prepared by reacting a purified basic calcium lignosulphonate with NaOH corresponding to one-half to two-thirds the weight of the lignin. This process has the disadvantage of low yields and depends on the value of the vanillin produced for its commercial success.

It is generally agreed that calcium lignin sulphonate as derived from spent sulphite liquor requires some purification before being suitable for many dispersant applications. One method of separating a lignin fraction is by lime precipitation as in the United States Patent Reissue No. 18,268 to Howard. Acid precipitation can be used if the solubility of the lignin sulphonate is reduced by a partial desulphonation.

A principal object of this invention is to provide a method of producing lignin dispersing agent wherein the yield and quality of the product is improved.

Another object is to provide a lignin dispersing agent of superior dispersing action.

Another object is to provide a lignin dispersing agent which is particularly suitable for use in preparing aqueous dispersions of dyes.

The present invention employs as a lignin sulphonate-containing starting material an unpurified calcium base spent sulphite liquor or a sodium base sulphite liquor as produced by any suitable conventional or known process.

In accordance with the invention, alkaline hydrolysis of the lignin sulphonate is effected by adding to the starting liquor NaOH corresponding to 15 to 25 percent of the lignin present or sufficient to produce a pH not less than 10.5 to 11.5 at the end of the cook, in the presence of zinc dust, a zinc salt such as zinc sulphate, or zinc oxide in an amount corresponding approximately to 0.5 to 4 percent of zinc based on the weight of lignin present.

The hydrolysis is carried out at temperatures between about 156° C. and 178° C. for one to two hours. The sulphonate sulphur content of the lignin sulphonate changes from about 3.5% to about 0.5% depending on the conditions of the process which may be varied to suit the particular dispersant that it is desired to produce. For certain uses, it is sufficient to adjust the pH and spray dry the product without further processing.

If a low ash product is required that is substantially free from carbohydric components and various anions, the lignin may be precipitated from the processed liquor by the addition of an inorganic acid i.e., sulphuric or sulphurous at a temperature of 60 to 65° C. to give a pH of about 3.5 in the mixture which is then heated to about 70° C. to 80° C. whereby the lignin sulphonate precipitates on cooling the mixture and can be filtered. The filter cake forms very rapidly and can be washed free of sulphate and other ions. The washed cake is readily soluble in water when a small amount of NaOH is added to give a mixture a pH of 5 to 9. From such solution a product may be obtained in the form of a dark brown non-hygroscopic powder in a spray drier.

2

We have found that when a lignin sulphonate is subjected to alkaline hydrolysis in the presence of zinc dust, zinc salt or zinc oxide at elevated pressure and temperature, the dispersing action of the product is superior to a product prepared under the same conditions without the zinc, and with or without air oxidation.

We have further found that the yield and quality of the precipitate formed by addition of a mineral acid is improved by the zinc dust, zinc salt or zinc oxide treatment. In the presence of zinc, there is no appreciable change in the degree of sulphonation of the lignin sulphonate. The zinc may possibly promote the formation of larger molecules having a lower solubility than the smaller lignin molecules or it may act as a catalyst in promoting the selective desulphonation of the larger lignin sulphonate molecules. In any case, the explanation of the mode of action is not essential to the present invention.

The following examples are illustrative of the invention:

*Example I*

A lignin dispersant was prepared as described above with the use of 2 percent zinc dust. The yield of the precipitated product was 40 percent based on the weight of the lignin in the starting material.

A similar preparation was made except that air oxidation was used instead of the zinc treatment. The yield of the precipitated product was 18 percent.

The dispersing agent was dissolved in water and milled in a porcelain ball mill with a 14 percent slurry of a vat dye. With each dispersant, the resulting paste was free flowing. It should be noted that when untreated spent sulphite is milled with such a dye, a gel is obtained. The relative quality of the two pastes was determined by the apparent viscosity taken at a constant reading in the MacMichael viscosimeter. It will be noted from the values given in the table below that our dispersing agent produces a considerably lower viscosity, thus indicating superior dispersing action.

| Dispersing Agent | Concentration of Dispersant, percent on dispersate | pH of Dispersion | Viscosity, M° |
|---|---|---|---|
| Air oxidation product | 25 | 9 | 43 |
| Lignin dispersant by zinc treatment | 25 | 9 | 26 |

*Example II*

The same procedure as in Example I was followed except that 2.5% zinc sulphate (based on the zinc content) was used instead of zinc dust. The yield of precipitated product was 38.0%.

The following table provides a comparison of the product with one produced by air oxidation without zinc treatment:

| Dispersing Agent | Concentration of Dispersant, percent on dispersate | pH of Dispersion | Viscosity, M° |
|---|---|---|---|
| Air oxidation product | 25 | 9 | 43 |
| Lignin dispersant by zinc treatment | 25 | 9 | 29 |

*Example III*

To a sodium base liquor was added NaOH corresponding to 16.7 percent of the lignin and produced a pH of 13.4. Zinc oxide corresponding to 2% of zinc based on the weight of the lignin was added. The hydrolysis was carried out at a temperature between 156° C. and 178° C.

for 4 hours. The pH of the product was adjusted to 8.5 with NaOH and then spray dried.

*Example IV*

A lignin dispersant was prepared as described in Example I except that 0.5 percent zinc dust was used, the time of treatment being 3 hours at a temperature of 150° C. and a pressure of 100 p.s.i. The yield of precipitate was 30.7%.

*Example V*

A lignin dispersant was prepared as described in Example I except that 0.5 percent zinc dust was used, the time of treatment being 2 hours at a temperature of 150° C. and a pressure of 100 p.s.i. The yield of precipitate was 32.6%.

*Example VI*

A dispersed dye was milled with the lignin sulphonate and the resulting product was used to dye cellulose acetate according to accepted dyeing methods. The dispersing efficiency of the lignin sulphonate was judged by the colorfastness of the test specimens to rubbing (crocking) according to ASTCC Standard Test Method 8.52. The transference was evaluated by the ASTCC Color Transference Evaluation Chart whereby Class 1 is the poorest and Class 5 is the best.

| Dispersing Agent | Percent dye | Colorfastness to rubbing |
|---|---|---|
| Air oxidation product (without precipitation) | 4 | Class 1. |
| Lignin dispersant of Example I (without precipitation). | 4 | Class 2. |
| Lignin dispersant of Example I (with precipitation). | 4 | Class 3. |
| Air oxidation product (without precipitation) | 2 | Class 2. |
| Lignin dispersant of Example III (without precipitation). | 2 | Class 5. |

It may be noted that zinc treated lignin sulphonate produces satisfactory colorfastness and that a further colorfastness results by the use of the precipitated product.

As previously indicated, we may use as a starting material, unpurified lignin sulphonate as obtained by any commercial sulphite pulping method. For some purposes, a lime free lignin sulphonate is required. If calcium base spent sulphite liquor is the starting material, we have found that a considerable amount of the lime separates out as calcium bisulphite or calcium sulphate when caustic is added. A further amount of calcium sulphate separates out if purification of the product of the zinc catalyzed alkaline hydrolysis is carried out by the addition of sulphuric acid.

We claim:

1. A process of producing a partly desulphonated lignin sulphonate dispersing agent which comprises forming a liquor consisting essentially of a lignosulphonate, sodium hydroxide, and at least one of a group consisting of zinc, zinc oxide, and zinc salts, then heating the said liquor at a temperature of approximately 156° C. to 178° C. to hydrolyse said lignosulphonate, and drying the resulting solution.

2. A process of producing a partly desulphonated lignin sulphonate dispersing agent as defined in claim 1, wherein the total zinc content in said liquor is 0.5 to 4 percent of the weight of the lignin present in said liquor.

3. A process of producing a partly desulphonated lignin sulphonate dispersing agent as defined in claim 2, wherein said zinc content is approximately 2 percent of the weight of lignin present in said liquor.

4. A process of producing a partly desulphonated lignin sulphonate dispersing agent which comprises forming a liquor consisting essentially of a lignosulphonate, sodium hydroxide and at least one of a group consisting of zinc, zinc oxide, and zinc salts, then heating said liquor at a temperature of approximately 156° C. to 178° C. to hydrolyse said lignosulphonate, the total zinc content in said liquor being 0.5 to 4 percent of the weight of lignin present in said liquor, acidifying the resulting solution to precipitate partly desulphonated hydrolysed lignosulphonate compounds, and washing the precipitate to remove soluble compounds therefrom.

5. A process of producing a partly desulphonated lignin sulphonate dispersing agent as defined in claim 4, including the step of dissolving the washed product in water containing caustic alkali to produce a water-soluble dispersing agent.

6. A process of producing a partly desulphonated lignin sulphonate dispersing agent which comprises forming a liquor consisting essentially of lignin sulphonate compounds, sodium hydroxide, and at least one of a group consisting of zinc dust, zinc oxide, and zinc salts to provide a total zinc content in said liquor of approximately 0.5 to 4 percent of the lignin present in said liquor, then heating said liquor under pressure at a temperature of approximately 156° C. to 178° C. for 1 to 2 hours acidifying the resulting solution to precipitate partly desulphonated hydrolysed lignin sulphonate compounds, washing the precipitate to remove inorganic sulphates therefrom, dissolving the washed product in an aqueous solution of caustic alkali having a pH of approximately 5 to 9, and drying the said aqueous solution to yield a water-soluble dispersing agent.

References Cited in the file of this patent

UNITED STATES PATENTS 2,710,225 Van Blaricom et al. ----- June 7, 1955

FOREIGN PATENTS 286,808 Great Britain ----------- Mar. 15, 1928